United States Patent
Kim et al.

(10) Patent No.: US 11,801,664 B2
(45) Date of Patent: *Oct. 31, 2023

(54) STEEL SHEET FOR HOT PRESS FORMED MEMBER HAVING EXCELLENT RESISTANCE TO HYDROGEN DELAYED FRACTURE AND METHOD FOR MANUFACTURING THEREOF

(71) Applicant: POSCO CO., LTD, Pohang-si (KR)

(72) Inventors: Seong-Woo Kim, Gwangyang-si (KR); Jin-Keun Oh, Gwangyang-si (KR); Yeol-Rae Cho, Jeollanam-do (KR)

(73) Assignee: POSCO CO., LTD., Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,396

(22) Filed: Apr. 25, 2022

(65) Prior Publication Data

US 2022/0250353 A1    Aug. 11, 2022

Related U.S. Application Data (63) Continuation of application No. 16/617,823, filed as application No. PCT/KR2018/006255 on May 31, 2018, now Pat. No. 11,338,549.

(30) Foreign Application Priority Data

Jun. 1, 2017  (KR) .................. 10-2017-0068651
Aug. 10, 2017 (KR) .................. 10-2017-0101567

(51) Int. Cl.
*B32B 15/01*    (2006.01)
*C22C 38/02*    (2006.01)
(Continued)

(52) U.S. Cl.
CPC ............ *B32B 15/012* (2013.01); *B21D 22/02* (2013.01); *B21D 22/022* (2013.01); *B21D 35/00* (2013.01);
(Continued)

(58) Field of Classification Search
None
See application file for complete search history.

(56) References Cited

U.S. PATENT DOCUMENTS 5,356,724 A    10/1994  Tsuda et al.
6,296,805 B1   10/2001  Laurent et al.
(Continued)

FOREIGN PATENT DOCUMENTS

CA    2956537 A1   2/2016
CN    1531604 A    9/2004
(Continued)

OTHER PUBLICATIONS

Japanese Office Action—Japanese Patent Application No. 2019-565877 dated Dec. 1, 2020.
(Continued)

*Primary Examiner* — Jenny R Wu
(74) *Attorney, Agent, or Firm* — MORGAN, LEWIS & BOCKIUS LLP (57) ABSTRACT

Provided is a steel sheet for a hot press formed member having excellent resistance to hydrogen delayed fracture, and a method for manufacturing the same. A steel sheet for a hot press formed member comprises: a base steel sheet; an aluminum alloy plating layer on a surface of the base steel sheet; and an oxide layer which is formed on a surface of the plating layer and has a thickness of 0.05 μm or more.

11 Claims, 7 Drawing Sheets

(51) Int. Cl.

| | |
|---|---|
| *C22C 38/04* | (2006.01) |
| *C22C 38/06* | (2006.01) |
| *C22C 38/28* | (2006.01) |
| *C22C 38/32* | (2006.01) |
| *C23C 2/12* | (2006.01) |
| *C23C 2/28* | (2006.01) |
| *B21D 22/02* | (2006.01) |
| *C22C 38/00* | (2006.01) |
| *C21D 9/46* | (2006.01) |
| *C22F 1/00* | (2006.01) |
| *C22F 1/04* | (2006.01) |
| *C21D 6/00* | (2006.01) |
| *C23C 2/40* | (2006.01) |
| *C23F 17/00* | (2006.01) |
| *B21D 35/00* | (2006.01) |
| *C23C 26/00* | (2006.01) |
| *C23C 28/02* | (2006.01) |
| *C23C 30/00* | (2006.01) |
| *C23C 28/00* | (2006.01) |
| *B32B 15/18* | (2006.01) |
| *C23C 2/04* | (2006.01) |
| *B32B 15/04* | (2006.01) |
| *C23C 2/26* | (2006.01) |
| *C23C 2/06* | (2006.01) |
| *C22C 30/00* | (2006.01) |
| *C22C 38/14* | (2006.01) |
| *C22C 38/48* | (2006.01) |
| *C22C 38/40* | (2006.01) |
| *C22C 38/18* | (2006.01) |
| *C22C 38/42* | (2006.01) |
| *C22C 38/44* | (2006.01) |
| *C22C 38/08* | (2006.01) |
| *C22C 38/16* | (2006.01) |
| *C22C 38/24* | (2006.01) |
| *C22C 21/00* | (2006.01) |
| *C22C 38/38* | (2006.01) |
| *C22C 38/46* | (2006.01) |
| *C22C 38/20* | (2006.01) |
| *C22C 38/26* | (2006.01) |
| *C22C 38/22* | (2006.01) |
| *C22C 38/58* | (2006.01) |
| *C22C 38/12* | (2006.01) |
| *C22C 38/50* | (2006.01) |
| *C22C 38/54* | (2006.01) |
| *B21D 37/16* | (2006.01) |
| *B32B 5/20* | (2006.01) |
| *B32B 5/18* | (2006.01) |

(52) U.S. Cl.
CPC ........... *B21D 35/005* (2013.01); *B21D 37/16* (2013.01); *B32B 5/18* (2013.01); *B32B 5/20* (2013.01); *B32B 15/01* (2013.01); *B32B 15/011* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 9/46* (2013.01); *C22C 21/00* (2013.01); *C22C 30/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22F 1/002* (2013.01); *C22F 1/04* (2013.01); *C23C 2/04* (2013.01); *C23C 2/06* (2013.01); *C23C 2/12* (2013.01); *C23C 2/26* (2013.01); *C23C 2/28* (2013.01); *C23C 2/40* (2013.01); *C23C 26/00* (2013.01); *C23C 28/023* (2013.01); *C23C 28/321* (2013.01); *C23C 28/322* (2013.01); *C23C 30/00* (2013.01); *C23C 30/005* (2013.01); *C23F 17/00* (2013.01); *Y10T 428/12479* (2015.01); *Y10T 428/12757* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/12993* (2015.01)

(56) References Cited

U.S. PATENT DOCUMENTS

| | | |
|---|---|---|
| 11,141,953 B2 | 10/2021 | Oh et al. |
| 2004/0009366 A1 | 1/2004 | Takagi et al. |
| 2011/0006491 A1 | 1/2011 | Spehner et al. |
| 2011/0008647 A1 | 1/2011 | Azuma et al. |
| 2011/0030441 A1 | 2/2011 | Maki et al. |
| 2011/0159314 A1 | 6/2011 | Kim et al. |
| 2011/0174418 A1 | 7/2011 | Maki et al. |
| 2012/0267012 A1 | 10/2012 | Sohn et al. |
| 2013/0220490 A1 | 8/2013 | Hayashi et al. |
| 2013/0280552 A1 | 10/2013 | Bae et al. |
| 2013/0340899 A1 | 12/2013 | Kusumi et al. |
| 2014/0120366 A1 | 5/2014 | Sohn |
| 2014/0234659 A1 | 8/2014 | Kawata et al. |
| 2014/0363697 A1 | 12/2014 | Kim et al. |
| 2015/0017474 A1 | 1/2015 | Harako et al. |
| 2015/0044499 A1 | 2/2015 | Maki et al. |
| 2016/0158822 A1 | 6/2016 | Nakajima et al. |
| 2016/0376679 A1 | 12/2016 | Kim et al. |
| 2017/0002450 A1 | 1/2017 | Kim et al. |
| 2017/0029955 A1 | 2/2017 | Kim et al. |
| 2019/0003029 A1* | 1/2019 | Oh .................... C23C 2/12 |
| 2020/0109464 A1 | 4/2020 | Kim et al. |
| 2022/0033929 A1 | 2/2022 | Kim et al. |

FOREIGN PATENT DOCUMENTS

| | | |
|---|---|---|
| CN | 1255272 | 5/2006 |
| CN | 101910426 A | 12/2010 |
| CN | 101960034 | 1/2011 |
| CN | 102066615 | 5/2011 |
| CN | 102089451 | 6/2011 |
| CN | 102791901 A | 11/2012 |
| CN | 103168106 | 6/2013 |
| CN | 103261466 | 8/2013 |
| CN | 103429774 | 12/2013 |
| CN | 103492605 A | 1/2014 |
| CN | 103764866 | 4/2014 |
| CN | 103842543 A | 6/2014 |
| CN | 104024464 | 9/2014 |
| CN | 104145039 | 11/2014 |
| CN | 104220641 | 12/2014 |
| CN | 105849305 A | 8/2016 |
| CN | 110709183 A | 1/2020 |
| EP | 2312005 | 4/2011 |
| EP | 2527481 | 11/2012 |
| EP | 2695963 B1 | 11/2021 |
| JP | 559056569 | 4/1984 |
| JP | S64-56881 A | 3/1989 |
| JP | H03-285057 A | 12/1991 |
| JP | H05255890 | 10/1993 |

(56) References Cited

FOREIGN PATENT DOCUMENTS

| | | |
|---|---|---|
| JP | 9-28582 A | 2/1997 |
| JP | 2003535976 | 12/2003 |
| JP | 2004-002932 A | 1/2004 |
| JP | 2004002931 | 1/2004 |
| JP | 2004043887 | 2/2004 |
| JP | 2004176181 | 6/2004 |
| JP | 2004-244704 A | 9/2004 |
| JP | 2009256733 | 11/2009 |
| JP | 2011512455 | 4/2011 |
| JP | 2011137210 | 7/2011 |
| JP | 2011-149084 A | 8/2011 |
| JP | 2012-041597 A | 3/2012 |
| JP | 2012-041613 A | 3/2012 |
| JP | 2012082511 | 4/2012 |
| JP | 2012-092365 A | 5/2012 |
| JP | 2013221202 | 10/2013 |
| JP | 2013-227614 A | 11/2013 |
| JP | 2016006224 | 1/2016 |
| JP | 2017511839 | 4/2017 |
| JP | 2019506523 | 3/2019 |
| KR | 20100112602 | 10/2010 |
| KR | 20110018420 | 2/2011 |
| KR | 20150073021 | 6/2015 |
| KR | 101536703 | 7/2015 |
| KR | 20150075435 | 7/2015 |
| KR | 101569505 | 11/2015 |
| KR | 101696121 | 1/2017 |
| WO | 2001094664 | 12/2001 |
| WO | 02/103073 A2 | 12/2002 |
| WO | 2009090443 | 7/2009 |
| WO | 20100005121 | 1/2010 |
| WO | 2014/203445 A1 | 12/2014 |
| WO | 2018096387 | 5/2018 |

OTHER PUBLICATIONS

Japanese Office Action—Japanese Patent Application No. 2019-565854 dated Aug. 3, 2021.
Japanese Office Action—Japanese Patent Application No. 2019-565877 dated Aug. 3, 2021.
Yang, et al., "Effect of Nb addition on structure and mechanical properties of FeAl coating," Surface & Coatings Technology, Mar. 2015, vol. 270, pp. 221-226.
U.S. Office Action dated Jul. 1, 2021 issued in U.S. Appl. No. 16/617,823.
Japanese Office Action dated Apr. 4, 2023, issued in corresponding Japanese Patent Application No. 2022-065569.
Chinese Office Action dated Mar. 14, 2023, issued in corresponding Chinese Patent Application No. 202211007846.9.
U.S. Non-Final Office Action dated Jan. 10, 2023 issued in U.S. Appl. No. 17/517,399.
U.S. Non-Final Office Action dated Dec. 21, 2022 issued in U.S. Appl. No. 17/394,830.
International Search Report—PCT/KR2018/006255 dated Oct. 2, 2018.
U.S. Non-Final Office Action dated Aug. 13, 2021 issued in U.S. Appl. No. 16/617,823.
U.S. Notice of Allowance dated Jan. 26, 2022 issued in U.S. Appl. No. 16/617,823.
Chinese Office Action—Chinese Application No. 201880035473.1 dated Jun. 18, 2020.
European Search Report—European Patent Application No. 18808695.3 dated May 19, 2020.
European Search Report—European Patent Application No. 18810215.6 dated May 19, 2020.
European Search Report—European Patent Application No. 18810671.0 dated May 26, 2020.
Suehiro, et al., "Properties of Aluminum-coated Steels for Hot-forming," Nippon Steel Technical Report, No. 88, Jul. 2003, pp. 16-21.
Chinese Office Action—Chinese Patent Application No. 201880036255.X dated Sep. 1, 2020.
Chinese Office Action—Chinese Patent Application No. 201880036329.X dated Sep. 1, 2020.
U.S. Office Action—U.S. Appl. No. 16/617,798 dated Oct. 16, 2020.
Japanese Office Action—Japanese Patent Application No. 2019-565849 dated Dec. 8, 2020.
Japanese Office Action—Japanese Patent Application No. 2019-565854 dated Nov. 24, 2020.
Japanese Office Action dated Jun. 21, 2022 issued in Japanese Patent Application No. 2021-180241.
Chinese Office Action dated Nov. 16, 2022 issued in Chinese Patent Application No. 202110582463.3.
Chinese Office Action dated Aug. 10, 2023 issued in Chinese Patent Application No. 202211007846.9.

* cited by examiner

STEEL SHEET FOR HOT PRESS FORMED MEMBER HAVING EXCELLENT RESISTANCE TO HYDROGEN DELAYED FRACTURE AND METHOD FOR MANUFACTURING THEREOF

CROSS-REFERENCE TO RELATED APPLICATIONS

This application is a Continuation Patent Application of U.S. patent application Ser. No. 16/617,823, filed on Nov. 27, 2019, which is a U.S. National Phase under 35 U.S.C. § 371 of International Patent Application No. PCT/KR2018/006255, filed on May 31, 2018, which claims priority to and the benefit of Korean Application No. 10-2017-0068651, filed on Jun. 1, 2017 and Korean Application No. 10-2017-0101567, filed on Aug. 10, 2017, the entire contents of which are incorporated herein by reference.

TECHNICAL FIELD

The present disclosure relates to a steel sheet for a hot press formed member having excellent resistance to hydrogen delayed fracture and a method for manufacturing the same.

BACKGROUND ART

In recent years, due to depletion of petroleum energy resources and high interest in environmental protection, regulations on improving the fuel efficiency of automobiles are becoming stronger.

In terms of materials, reducing a thickness of a steel sheet used in automobiles is one method for improving the fuel efficiency of automobiles; however, reducing the thickness of a steel sheet may cause problems in the safety of automobiles, such that the strength of the steel sheet should be supported.

Thus, demand for high-strength steel sheets has been continuously generated, and various kinds of steel sheets have been developed. However, since these steel sheets have high strength in themselves, there is a problem that workability thereof is poor. That is, since a product of strength and elongation for each grade of steel sheet tends to always have a constant value, when the strength of the steel sheet increases, there may be a problem that elongation, an index of workability, decreases.

In order to solve this problem, a hot press forming method has been proposed. The hot press forming method is a method of forming a low temperature structure, such as martensite, in a steel sheet by forming at a high temperature suitable for forming and then quenching the steel sheet at a low temperature to increase the strength of the final product. In this case, there is an advantage that the problem of workability may be significantly reduced when manufacturing a member having high strength.

When a steel sheet goes through such a hot process forming process, the steel sheet may have strength of 1000 MPa or higher, or 1470 MPa or higher in some cases. Recently, a level of requirements for strength has increased such that a steel sheet may have strength of 1800 MPa or higher. When strength of a steel sheet increases, however, the steel sheet may become vulnerable to hydrogen delayed fracture such that, even when the steel sheet includes a relatively small amount of hydrogen, the steel sheet may reach breakage point.

DISCLOSURE

Technical Problem

An aspect of the present disclosure is to provide a steel sheet for a hot press formed member having excellent resistance to hydrogen delayed fracture and a method for manufacturing the steel sheet.

The problem to address in the present disclosure is not limited thereto. A person having ordinary skill in the art may not have any difficulty in understanding additional purposes of the present disclosure based on overall features of the present disclosure.

Technical Solution

According to an aspect of the present disclosure, a steel sheet for a hot press formed member having excellent resistance to hydrogen delayed fracture includes a base steel sheet; an aluminum alloy plating layer formed on a surface of the base steel sheet; and an oxide layer formed on a surface of the plating layer and having a thickness of 0.05 µm or greater.

In one embodiment of the present disclosure, the aluminum alloy plating layer may include 35 weight % or higher of Fe.

In one embodiment of the present disclosure, the aluminum alloy plating layer may include 45 weight % or higher of Fe.

In one embodiment of the present disclosure, the aluminum alloy plating layer may include 50 weight % or higher of Fe.

In one embodiment of the present disclosure, a lightness value of a surface of the steel sheet may be 70 or lower, where the lightness value refers to an L value in a CIE colorimetric system (L*a*b* colorimetric system) prescribed in KS A 0067.

In one embodiment of the present disclosure, the base steel sheet may have a composition including, by wt %, carbon (C): 0.04% to 0.5%, silicon (Si): 0.01% to 2%, manganese (Mn): 0.01% to 10%, aluminum (Al): 0.001% to 1.0%, phosphorus (P): 0.05% or less, sulfur (S): 0.02% or less, nitrogen (N): 0.02% or less, and residual iron (Fe) and inevitable impurities.

In one embodiment of the present disclosure, a composition of the base steel sheet may further include, by wt %, one or more among a sum of one or more selected from a group consisting of Cr, Mo, and W: 0.01% to 4.0%, a sum of one or more selected from a group consisting of Ti, Nb, Zr, and V: 0.001% to 0.4%, Cu+Ni: 0.005% to 2.0%, Sb+Sn: 0.001% to 1.0%, and B: 0.0001 to 0.01%.

According to an aspect of the present disclosure, a method of manufacturing a steel sheet for a hot press formed member having excellent resistance to hydrogen delayed fracture includes obtaining an aluminum plated steel sheet by plating a surface of a base steel sheet with aluminum and coiling; obtaining an aluminum alloy plated steel sheet by annealing the aluminum plated steel sheet; and cooling the aluminum alloy plated steel sheet, an amount of the plated aluminum is 30 to 200 g/m² with reference to one side of the steel sheet, coiling tension is 0.5 to 5 kg/mm² during the coiling, the annealing is performed in a batch annealing furnace in a heating temperature range of 550 to 750° C. for 30 minutes to 50 hours, when the steel sheet is heated from a room temperature to the heating temperature in the annealing, an average temperature increase rate is 20 to 100° C./h, an average temperature increase rate in 400 to 500° C.

section is 1 to 15° C./h, and a temperature increase rate in a temperature section from the heating temperature −50° C. to the heating temperature is 1 to 15° C./h, a partial oxygen pressure in the batch annealing furnace during a heat treatment is air pressure $10^{-70}$ to $10^{-20}$, and a difference between an atmospheric temperature in the batch annealing furnace and a temperature of the steel sheet is 5 to 80° C.

In one embodiment of the present disclosure, the base steel sheet may have a composition including, by wt %, carbon (C): 0.04% to 0.5%, silicon (Si): 0.01% to 2%, manganese (Mn): 0.01% to 10%, aluminum (Al): 0.001% to 1.0%, phosphorus (P): 0.05% or less, sulfur (S): 0.02% or less, nitrogen (N): 0.02% or less, and residual iron (Fe) and inevitable impurities.

In one embodiment of the present disclosure, a composition of the base steel sheet may further include, by wt %, one or more among a sum of one or more selected from a group consisting of Cr, Mo, and W: 0.01% to 4.0%, a sum of one or more selected from a group consisting of Ti, Nb, Zr, and V: 0.001% to 0.4%, Cu+Ni: 0.005% to 2.0%, Sb+Sn: 0.001% to 1.0%, and B: 0.0001 to 0.01%.

Advantageous Effects

According to an aspect of the present disclosure, as a steel sheet for a hot press forming process is coated with an Al—Fe based plating layer, and an oxide is formed on a surface of the plating layer, reaction between moisture and Al may be prevented such that hydrogen, generated as a by-product, may be reduced. As a result, protrusion of hydrogen into the steel sheet may be prevented such that delayed fracture may be prevented.

BEST MODE FOR INVENTION

Hereinafter, the present disclosure will be described in greater detail.

In the present disclosure, the term "member" refers to a component manufactured by hot press forming or a material for the component. In addition, the term "steel sheet" means a steel sheet before hot press forming, and the steel sheet may be wound during a manufacturing process to have a coil form. In this case, the steel sheet is also called as a "coil".

When a hot press forming method is used, a steel sheet may need to be heated to a high temperature, and a surface of the steel sheet may be oxidized. Accordingly, a process for removing an oxide from a surface of the steel sheet may need to be added after a press forming process.

To address the above-described issue, the invention disposed in U.S. Pat. No. 6,296,805 has been suggested. In the disclosure, a steel sheet plated with aluminum is hot-press formed or room-temperature formed, is heated, and is rapidly cooled (in simple terms, "post heat treatment"). As the aluminum plating layer is present on a surface of the steel sheet, the steel sheet may not be oxidized during a heating process.

However, according to a result of research of the inventors of the present disclosure, it has been indicated that, when an aluminum plated steel plated is heated to perform a hot press forming process, a small amount of moisture inevitably included in a heating atmosphere may react with the aluminum plating layer such that hydrogen may be generated. As an example, although not limited thereto, chemical formula 1 below may be an example in which hydrogen is generated as the aluminum plating layer reacts with moisture.

$2Al + 3H_2O = Al_2O_3 + 3H_2$    [Chemical Expression 1]

Generated hydrogen may be included (absorbed) to the steel sheet by reaction of chemical formula 2 below, but an embodiment thereof is not limited thereto. [H] may refer to hydrogen absorbed to the steel sheet.

$H_2 = 2[H]$    [Chemical Expression 2]

Hydrogen delayed fracture may occur when the amount of hydrogen absorbed to the steel sheet increases to a threshold at which absorbed hydrogen causes delayed fracture, or higher. To increase resistance to hydrogen delayed fracture, the amount of absorbed hydrogen may be controlled to be reduced to not exceed the threshold, or even when the amount of hydrogen is high, the threshold may be increased such that delayed fracture may not occur. One embodiment of the present disclosure more focuses on a method of controlling the amount of hydrogen included in a hot press formed member to not exceed a threshold by decreasing the amount of hydrogen.

In other words, when a steel sheet for a hot press forming according to an embodiment of the present disclosure is used, even when the steel sheet is heated to a high temperature, reaction of hydrogen generation based on chemical formula 1, etc., may be reduced such that the amount of hydrogen generated in a hot press forming process may decrease.

To this end, in an embodiment, an aluminum alloy plated steel sheet including a base steel sheet, an aluminum alloy plating layer formed on a surface of the base steel sheet, and an oxide layer formed on a surface of the plating layer and having a thickness of 0.05 μm or greater may be provided.

The oxide layer may be formed on a surface of the aluminum alloy plating layer. When the steel sheet is heated for a hot press forming process, the oxide layer may prevent moisture included in atmosphere from contacting aluminum included in the plating layer. In this case, the amount of generated hydrogen may decrease such that the amount of hydrogen diffused to and included in the steel sheet may also decrease, which may reduce possibility of hydrogen delayed fracture.

To sufficiently obtain the effect, a thickness of the oxide layer formed on the plating layer may be 0.05 μm or greater. In another embodiment, a thickness of the oxide layer may be 0.1 μm or greater, and in another embodiment, a thickness of the oxide layer may be 0.3 μm or greater. In the present disclosure, it may not be necessary to set an upper limit of a thickness of the oxide layer, but when a thickness of the oxide layer is excessive, a thickness of the plating layer may decrease such that there may be a problem in securing corrosion resistance. Thus, an upper limit of a thickness of the oxide layer may be determined to be 2 μm, and the thickness may be determined to be 3 μm in one embodiment.

There may be one or more methods for measuring the thickness of the oxide layer, and in one embodiment, a thickness to a point at which the content of oxygen is 2% may be determined as a thickness of the oxide layer when the amount of oxygen is measured in a thickness direction from a surface by glow discharge spectrometry. A content of oxygen may rapidly decrease in a thickness direction form a surface, and in the case of a general aluminum plated steel sheet, even when a content of oxygen is greater than 20% on an outermost surface, a content of oxygen may be less than 0.5% at a point at which a depth is 0.05 μm.

In another embodiment, the aluminum alloy plating layer of the aluminum alloy plated steel sheet for a hot press forming process may include 35 weight % or higher of Fe, may include 45 weight % or higher of Fe preferably, or may include 50 weight % or higher of Fe more preferably.

In the embodiment, when a content of Fe in the aluminum alloy plating layer increases, aluminum may form an intermetallic compound or a solid solution with Fe, and in this case, activity of aluminum in the plating layer may greatly decrease as compared to that of a general aluminum plated steel sheet mainly formed of aluminum, and as a result, reactivity of chemical formula 1 may greatly decrease.

Thus, in the embodiment, a content of Fe in the aluminum alloy plating layer may be 35 weight % or higher, 45 weight % or higher, or 50 weight % or higher. An upper limit of an average content of Fe may not be determined to be any particular content, but may be determined to be 80 weight % or lower in consideration of efficiency in alloying. The average content of Fe means an average value of Fe content in an entire plating layer, and there may be several measuring methods. In this embodiment, however, a curve of a content of Fe according to a depth (thickness), which appears when analyzed from a surface of the plating layer to an interfacial surface of the steel sheet by glow discharge emission spectrometry (GDS), may be integrated, the integral value may be divided by a thickness of the plating layer, and a result value may be used as an average content of Fe.

There may be more than one reference to determine an interfacial surface between the plating layer and the steel sheet, and in an embodiment, a point at which a content of Fe is 92% of a content of Fe of base material on the basis of a result of the GDS may be determined as an interfacial surface between the plating layer and the steel sheet.

Also, according to an embodiment, a lightness value indicating whiteness of a surface of the aluminum alloy plated steel sheet for a hot press forming process may be 70 or lower. Whiteness of the steel sheet may be a factor affecting a temperature rising speed in accordance with a difference in radiation rate during a heating process, and a temperature rising speed may increase even under the same conditions by decreasing lightness of a surface of the steel sheet such that hydrogen from atmosphere may be reduced during a heating process for a hot press forming process. The lightness value indicating whiteness of a surface of the steel sheet may be measured using a spectrophotometer, and an L value in a CIE colorimetric system (L*a*b* colorimetric system) prescribed in KS A 0067 may be used. A lower limit of the lightness value may not be limited to any particular value, and according to one embodiment, the lightness value may be 10 or higher.

The steel sheet is a steel sheet for hot press forming, and if used for hot press forming, a composition thereof is not particularly limited. However, according to one aspect of the present disclosure, by wt % (hereinafter, unless noted otherwise, it is necessary to note that the composition of the steel sheet and the plating layer is based on weight), the steel sheet and the plating layer of the present disclosure may have the composition including, by wt %, C: 0.04 to 0.5%, Si: 0.01 to 2%, Mn: 0.01 to 10%, Al: 0.001 to 1.0%, P: 0.05% or less, S: 0.02% or less, and N: 0.02% or less.

C: 0.04 to 0.5%

C may be added in an appropriate amount as an essential element for increasing the strength of a heat treatment member. That is, in order to secure sufficient strength in the heat treatment member, the C may be added in an amount of 0.04% or more. In one embodiment, a lower limit of the C content may be 0.1%. However, if the content thereof is too high, in the case of manufacturing a cold rolled material, when the hot rolled material is cold-rolled, the strength of a hot rolled material is so high that cold rollability is greatly inferior, and spot weldability is also greatly reduced. Thus, C may be added in an amount of 0.5% or less to secure sufficient cold rollability and spot weldability. In addition, the C content may be limited to 0.45% or less or 0.4% or less.

Si: 0.01 to 2%

Si not only needs to be added as a deoxidizer in steelmaking, but also suppresses the formation of a carbide which most affects the strength of the member for hot press forming, and in the hot press forming, Si serves to secure residual austenite by concentrating carbon to the grain boundaries of martensite lath after forming martensite. Therefore, Si may be added in an amount of 0.01% or more. In addition, when aluminum plating is performed on the steel sheet after rolling, an upper limit may be set to be 2% in order to secure sufficient plating properties. In one embodiment of the present disclosure, the Si content may be limited to 1.5% or less.

Mn: 0.01 to 10%

Mn may be added in an amount of 0.01% or more in order to secure a solid solution strengthening effect and to lower a critical cooling rate for securing martensite in the member for hot press forming. In addition, the Mn content may be 10% or less in terms of securing workability of the hot press forming process by appropriately maintaining the strength of the steel sheet, reducing manufacturing costs, and improving spot weldability, and in one embodiment of the present disclosure, Mn may be included in an amount of 9% or less, or 8% or less.

Al: 0.001 to 1.0%

Al may be added in an amount of 0.001% or more since Al deoxidizes in steelmaking, together with Si, to increase cleanliness of steel, Al may be added in an amount of 0.001% or more. In addition, the content of Al may be 1.0% or less in order to prevent an Ac3 temperature from becoming too high so that heating required during hot press forming may be performed in an appropriate temperature range.

P: 0.05% or less

P is present as an impurity in steel, and the smaller the content thereof is, the more advantageous. Therefore, in one embodiment of the present disclosure, P may be included in an amount of 0.05% or less. In another embodiment of the present disclosure, P may be limited to 0.03% or less. Since less P is an advantageous impurity element, there is no need to particularly set an upper limit of the content thereof. However, in order to excessively lower the P content, there is a possibility that manufacturing costs may increase, and in consideration thereof, a lower limit thereof may be set to be 0.001%.

S: 0.02% or less

S is an impurity in steel, and the maximum content is 0.02% (preferably 0.01% or less) since S is an element that deteriorates ductility, impact characteristics, and weldability of a member. In addition, since manufacturing costs may increase when a minimum content thereof is less than 0.0001%, in one embodiment of the present disclosure, a lower limit of the content thereof may be 0.0001%.

N: 0.02% or less

N is an element included as an impurity in steel, and in order to reduce sensitivity for crack generation during slab continuous casting, and to secure impact characteristics, the lower the content is, the more advantageous, and thus, N may be included in an amount of 0.02% or less. Although a lower limit does not need to particularly determined, the N content may be set to be 0.001% or more in one embodiment of in consideration of an increase in manufacturing costs, or the like.

In the present disclosure, if necessary, in addition to the above-described steel composition, one or more of a sum of one or more selected from a group consisting of Cr, Mo, and W: 0.01 to 4.0%, a sum of one or more selected from a group consisting of Ti, Nb, Zr and V: 0.001 to 0.4%, Cu+Ni: 0.005 to 2.0%, Sb+Sn: 0.001 to 1.0%, and B: 0.0001 to 0.01% may further be added.

A sum of one or more selected from a group consisting of Cr, Mo and W: 0.01% to 4.0%

Cr, Mo, and W may improve hardenability and secure grain refinement and the strength through a precipitation strengthening effect, such that one or more these may be added in an amount of 0.01% or more, based on the total content. In addition, in order to secure weldability of the member, the content thereof may be limited to 4.0% or less. In addition, when the content of these elements exceeds 4.0%, a further increase in an effect is also not great, so when the content thereof is limited to 4.0% or less, it is also possible to prevent an increase in costs due to the addition of additional elements A sum of one or more selected from a group consisting of Ti, Nb, Zr and V: 0.001 to 0.4%

Ti, Nb, and V are effective in improving the strength of the heat treated member by forming fine precipitates, and in stabilizing retained austenite and improving impact toughness by grain refinement, such that it (they) may be added in an amount of 0.001% or more of one or more based on the total content. However, if an added amount exceeds 0.4%, an effect thereof is not only saturated, but also an increase in costs by the addition of excessive ferroalloy may be caused.

Cu+Ni: 0.005 to 2.0%

Cu and Ni are elements forming fine precipitates to improve strength. In order to obtain the above-described effects, a sum of one or more these elements may be 0.005% or more. However, if the value exceeds 2.0%, a cost increases excessively, so an upper limit thereof is 2.0%.

Sb+Sn: 0.001 to 1.0%

Sb and Sn may be concentrated on a surface during an annealing heat treatment for Al—Si plating to suppress the formation of a Si or Mn oxide on the surface to improve plating properties. Sb and Sn may be added in an amount of 0.001% or more in order to obtain such an effect. However, if an added amount exceeds 1.0%, since besides an excessive ferroalloy cost, solid solution at slab grain boundaries may cause coil edge cracks during hot rolling, an upper limit is 1.0%.

B: 0.0001 to 0.01%

B is an element that can not only improve hardenability but also be segregated in an old austenite grain boundary, and suppress brittleness of the member for hot forming due to grain boundary segregation of P or/and S by addition of a small amount. Therefore, B may be added in an amount of 0.0001% or more. However, if a content exceeds 0.01%, the effect is not only saturated, but also causes brittleness in hot rolling, so an upper limit thereof may be 0.01%, and in one embodiment, the content of B may be 0.005% or less.

Iron and inevitable impurities may be mentioned as a remainder other than the above-mentioned elements, and the element that can be included in the steel sheet for hot forming is not particularly limited.

Hereinafter an example of manufacturing method of steel for hot press forming is disclosed. However, a method of manufacturing a steel sheet for hot press forming described below is a mere example and it does not mean that the steel sheet for hot press forming of the present disclosure should be manufactured by the present manufacturing method, and it is to be noted that any manufacturing method meets the claims of the present disclosure and there is no problem in implementing each embodiment of the present disclosure.

The steel sheet of the present disclosure may be obtained by using a hot-rolled or a cold-rolled steel sheet, by performing molten aluminum plating on the surface of the base steel sheet, and performing an annealing treatment on the plated steel sheet.

[Aluminum Plating Process]

In an embodiment of the present disclosure, a process of preparing a base steel sheet, aluminum plating a surface of the base steel sheet under appropriate conditions and coiling is performed to obtain an aluminum plated steel sheet (coil).

Aluminum plating of the surface of the base steel sheet in a plating amount of 30 g/m$^2$ to 200 g/m$^2$ for each side An aluminum plating treatment may be performed on a surface of the rolled steel sheet. Aluminum plating may usually include AlSi plating (which may contain 80% or more of Al and 5% to 20% of Si, and additional elements as required), named as a type I, and any plating containing 90% or more of Al and additional elements as required, named as a type II. Hot dip aluminum plating may be performed to form a plating layer, and an annealing treatment may be performed on the steel sheet before plating. An appropriate plating amount when plating is 30 g/m² to 200 g/m² per one side surface. When the plating amount is too large, it may take an excessive time to alloy to the surface, whereas when the plating amount is too small, it may be difficult to obtain sufficient corrosion resistance.

Coiling tension after plating is set to be 0.5 kg/mm² to ~5 kg/mm²

When a coil is obtained by coiling the steel sheet after plating, coiling tension of the coil may be adjusted. According to the adjustment of the coiling tension of the coil, an alloying behavior and a surface quality of the coil may be changed during a subsequent annealing treatment. In one embodiment, the coiling tension may be controlled to be 0.7 to 3 kg/mm².

[Annealing Treatment Process]

An aluminum plated steel sheet obtained by the above-described process is subjected to annealing under the following conditions to obtain an aluminum alloy plated steel sheet.

Performing annealing for 30 minutes to 50 hours in a range of 550° C. to 750° C. in a batch annealing furnace An aluminum plated steel sheet (coil) is heated in a batch annealing furnace. When heating the steel sheet, it is desirable that a heat treatment target temperature and a holding time be maintained for 30 minutes to 50 hours in a range of 550° C. to 750° C. based on a temperature of the steel sheet (in the present disclosure, a highest temperature at which a material reaches in this temperature range is called as a heating temperature). The holding time is the time after a coil temperature reaches a target temperature until the start of cooling. In one embodiment of the present disclosure, when alloying is not sufficiently performed, a plating layer may be peeled off during roll leveling, such that a heating temperature may be 550° C. or higher for sufficient alloying. In addition, the heating temperature may be 750° C. or less in order to prevent excessive generation of oxides on a surface layer and to secure spot weldability. Further, in order to sufficiently secure the plating layer and prevent a decrease in productivity, the holding time may be set to be 30 minutes to 50 hours. In one embodiment, a temperature of the steel sheet may have a heating pattern in which the temperature continues to rise without a cooling process until a heating temperature is reached.

Heating to a heating temperature with an average time increase rate of 20° C./h to 100° C./h When heating the steel sheet at the above-described heating temperature, in order to secure sufficient productivity and to uniformly alloy the plating layer on all steel sheets (coils), the average temperature increase rate may be 20° C./h to 100° C./h based on the steel sheet (coil) temperature for an entire temperature section (a section from room temperature to a heating temperature). In addition, an overall average temperature increase rate may be controlled in the above numerical range, but in one embodiment, as described later, a temperature increase rate of a specific temperature section may be also controlled to achieve the object of the present disclosure.

Heating at an average temperature increase rate of 1° C./h to 15° C./h in a section of 400° C. to 500° C. at the time of temperature increase In one embodiment of the present disclosure, in order to secure sufficient productivity while preventing rolling oil remaining in the temperature range in which the rolling oil mixed during rolling is vaporized to cause surface stains, it may be heated at the average temperature increase rate of 1 to 15° C./h in the section of 400° C. to 500° C. at the time of temperature increase. In one embodiment of the present disclosure, a lower limit of the average temperature increase rate in the section of 400° C. to 500° C. at the time of the temperature increase may be 3° C./hr, and in another embodiment, a lower limit of the average temperature increase rate in the section of 400 to 500° C. at the time of the temperature increase may be also 4° C./hr.

Controlling partial pressure of oxygen in a batch annealing furnace to be $10^{-70}$ to $10^{-20}$ atm during a heat treatment In one embodiment, a method of reacting aluminum included in the plating layer with oxygen in atmosphere gas may be used to form oxide on a surface of the plating layer. Aluminum present in the plating layer may have high oxygen affinity, and may easily form an oxide. To this end, partial oxygen pressure may be controlled to be air pressure $10^{-70}$ or higher. When partial oxygen pressure is excessive high, formation of oxide may be excessive such that weldability may degrade. Thus, partial oxygen pressure may be controlled to be air pressure of $10^{-20}$ or lower.

Controlling a difference between an atmosphere temperature in a batch annealing furnace and a temperature of the steel sheet to be 5 to 80° C.

In general, heating of the batch annealing furnace employs a method of heating the steel sheet (coil) by increasing the atmospheric temperature in the annealing furnace, rather than a method of directly heating the steel sheet (coil). In this case, the difference between an atmospheric temperature and the coil temperature may not be avoided. However, the difference between the atmospheric temperature and the steel sheet temperature may be 80° C. or less, based on a point in time at which the heat treatment target temperature is reached in order to significantly reduce variations in materials and plating quality for each position in the steel sheet. It is ideal that the temperature difference should be as small as possible, but since this slows down the temperature increase rate, and thus it may be difficult to meet the overall average temperature increase rate, the temperature difference may be 5° C. or more in consideration thereof. The temperature of the steel sheet means a temperature measured in a bottom part of the charged steel sheet (coil) (a lowest portion of the coil), and the atmospheric temperature means a temperature measured at a center of the internal space of the heating furnace.

BEST MODE FOR INVENTION

In the description below, the present invention will be described in greater detail in accordance with embodiments. Embodiments of the present disclosure, however, may be provided to specify the present disclosure, and may not be provided to limit a scope of the present disclosure. That is because a scope of the present disclosure may be determined by matters recited in claims and matters logically inferred from the matters in the claims.

EXAMPLES

Manufacturing Steel Sheet

Inventive Example 1

A cold-rolled steel sheet for a hot press forming process having a composition as in Table 1 below was prepared. A surface of the steel sheet was plated using a type I plating bath having a composition of Al-9% Si-2.5% Fe. A plating amount in the plating was adjusted to be 75 g/m² on each side, and after the plating, the steel sheet was coiled with adjusting coiling tension to be 1.44 kg/mm².

TABLE 1

| | Element | | | | | | |
|---|---|---|---|---|---|---|---|
| C | Si | Mn | Al | P | S | N | Additional Element |
| Content (%) 0.24 | 0.25 | 1.6 | 0.015 | 0.01 | 0.002 | 0.004 | B: 0.003, Ti: 0.03 |

The plated steel sheet was heated in a batch annealing furnace to 650° C. under conditions as below.

An overall average temperature increase rate to 650° C.: 25° C./h

An average temperature increase rate in a temperature section 400 to 500° C.: 12.5° C./h Atmosphere at the time of heating: 100 vol % of hydrogen, and partial oxygen pressure of air pressure $10^{-30}$ A temperature difference between atmosphere and the steel sheet at the heating temperature: 30° C.

After heating the steel sheet, the steel sheet was maintained at a constant temperature for 10 hours, and the steel sheet was air-cooled, thereby obtaining a steel sheet for a hot press forming process.

Figure 1:
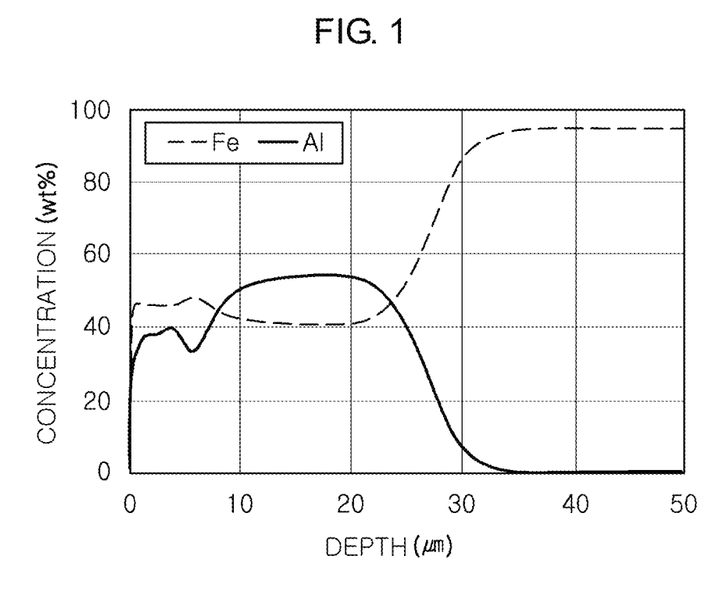
FIG. 1 is a compositional profile of a plating layer of a steel sheet manufactured by inventive example 1 analyzed by a glow discharge spectrometer (GDS) analyzer.
Figure 2:
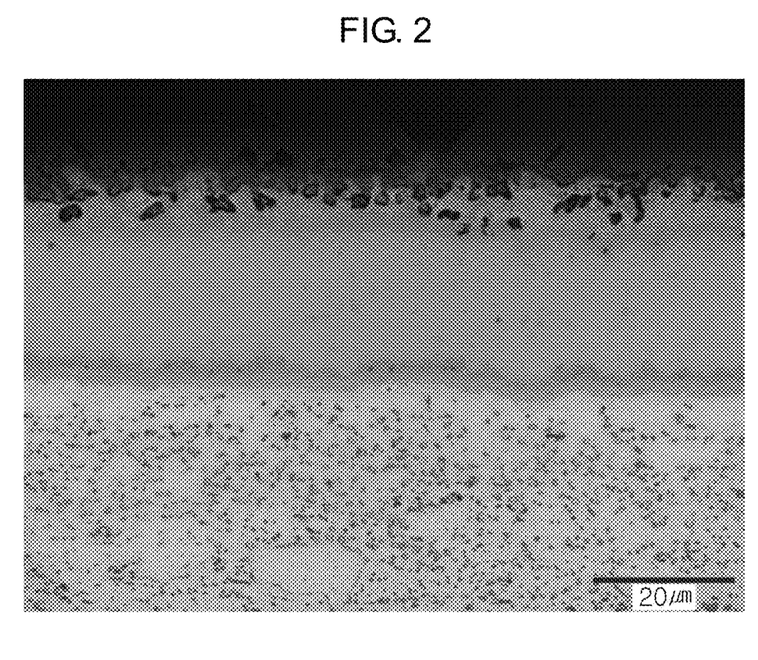
FIG. 2 is an optical microscopic image of a cross-sectional surface of a plating layer of a steel sheet manufactured by inventive example 1.
Figure 3:
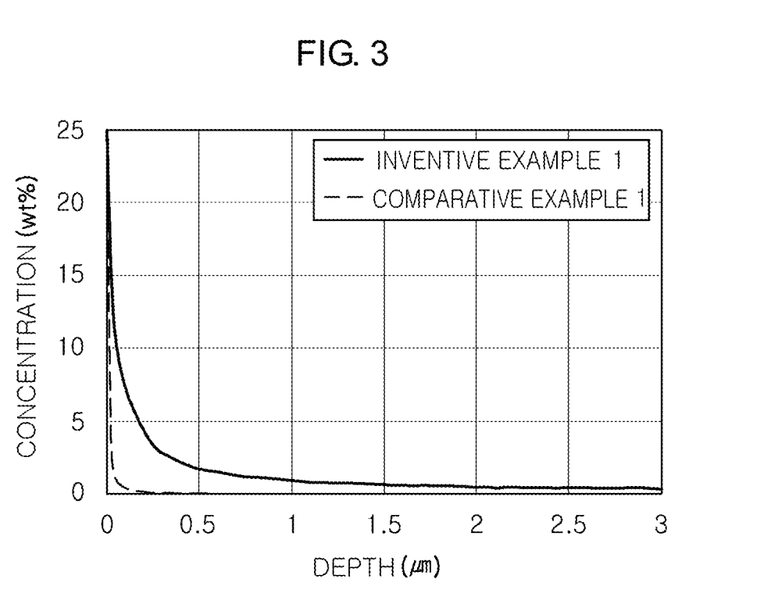
FIG. 3 is a graph illustrating a result of GDS analysis on contents of oxygen included in surface layers of inventive example 1 and comparative example 1.

According to a result of analysis of the plating layer of the steel sheet using a GDS, a composition profile as in FIG. 1 was obtained, and an average content of Fe calculated based on the analysis was 49.1 weight %. As for a form of a cross-sectional surface of the steel sheet, the plating layer was formed on an exterior surface of a base steel sheet as illustrated in FIG. 2, and referring to FIG. 3 illustrating a result of GDS analysis on a content of oxygen included a surface layer, an aluminum-based oxide layer having a thickness of 0.42 μm was formed on a surface of the plating layer. Also, according to a result of analysis of a surface of the steel sheet using a spectrophotometer, a lightness value (L*) was 50.2.

An amount of hydrogen absorbed to the steel sheet was analyzed using gas chromatography, and according to a result of the analysis, about 0.13 ppm of hydrogen was included in the steel sheet.

Inventive Example 2

A surface of the steel sheet having a composition as in Table 1 above was plated using a type I plating bath having a composition of Al-9% Si-2.5% Fe. A plating amount in the plating was adjusted to be 90 g/m² on each side, and after the plating, the steel sheet was coiled with adjusting coiling tension to be 1.9 kg/mm².

The plated steel sheet was heated to 670° C. in a batch annealing furnace under conditions as below.

An overall average temperature increase rate to 670° C.: 23° C./h

An average temperature increase rate in a temperature section 400 to 500° C.: 11° C./h Atmosphere at the time of heating: 100 vol % of hydrogen, and partial oxygen pressure of air pressure $10^{-34}$ A temperature difference between atmosphere and the steel sheet at the heating temperature: 20° C.

After the heating, the steel sheet was maintained at a constant temperature for 10 hours, and the steel sheet was air-cooled, thereby obtaining a steel sheet for a hot press forming process.

Figure 4:
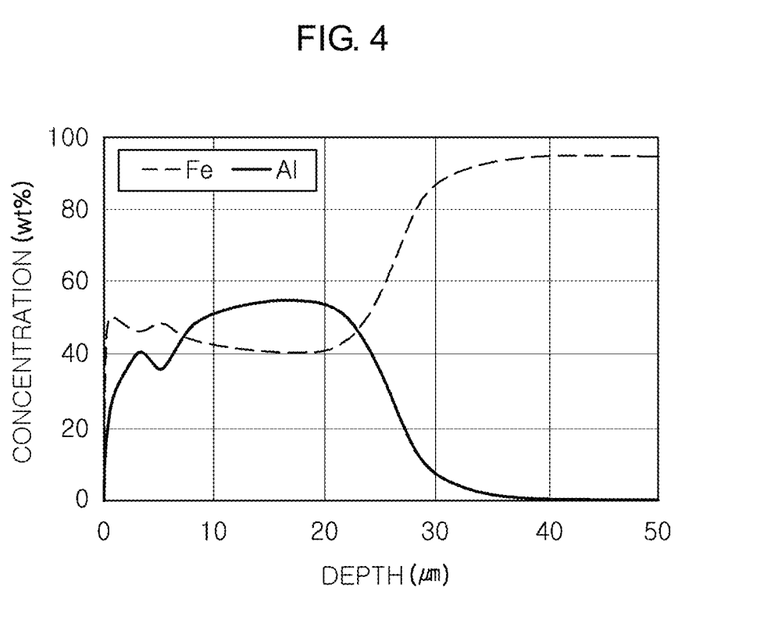
FIG. 4 is a compositional profile of a plating layer of a steel sheet manufactured by inventive example 2 analyzed by a GDS analyzer.
Figure 5:
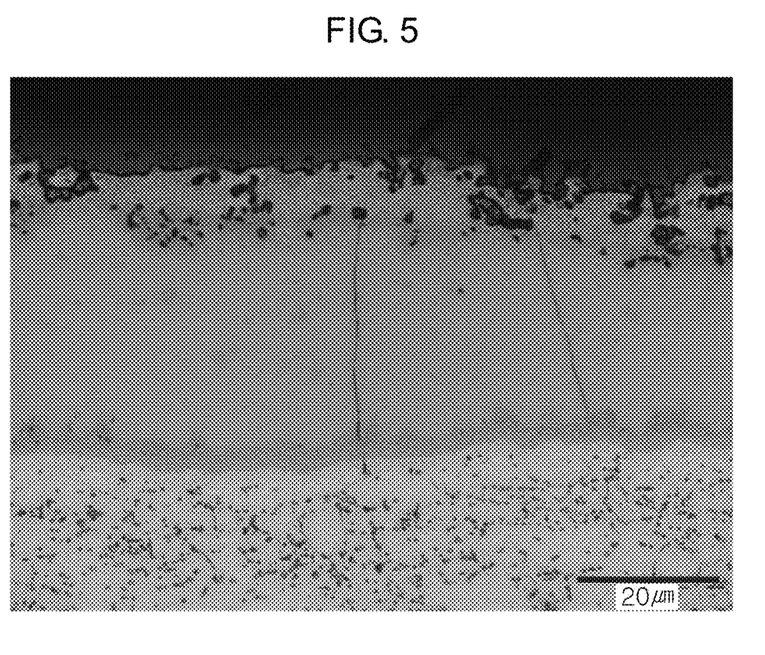
FIG. 5 is an optical microscopic image of a cross-sectional surface of a plating layer of a steel sheet manufactured by inventive example 2.

According to a result of analysis of the plating layer of the steel sheet using a GDS, a composition profile as in FIG. 4 was obtained, and an average content of Fe calculated based on the analysis was 51.1 weight %. As for a form of a cross-sectional surface of the steel sheet, the plating layer was formed on an exterior surface of a base steel sheet as illustrated in FIG. 5, and an aluminum-based oxide layer having a thickness of 0.37 μm was formed on a surface of the plating layer. Also, according to a result of analysis of a surface of the steel sheet using a spectrophotometer, a lightness value (L*) was 48.7.

Also, an amount of hydrogen absorbed to the steel sheet was analyzed using gas chromatography, and according to a result of the analysis, about 0.1 ppm of hydrogen was included in the steel sheet.

Comparative Example 1

The same aluminum plated steel sheet as in inventive example 1 to which the same plating process was performed and the heating and cooling processes were not performed was used as comparative example 1.

Figure 6:
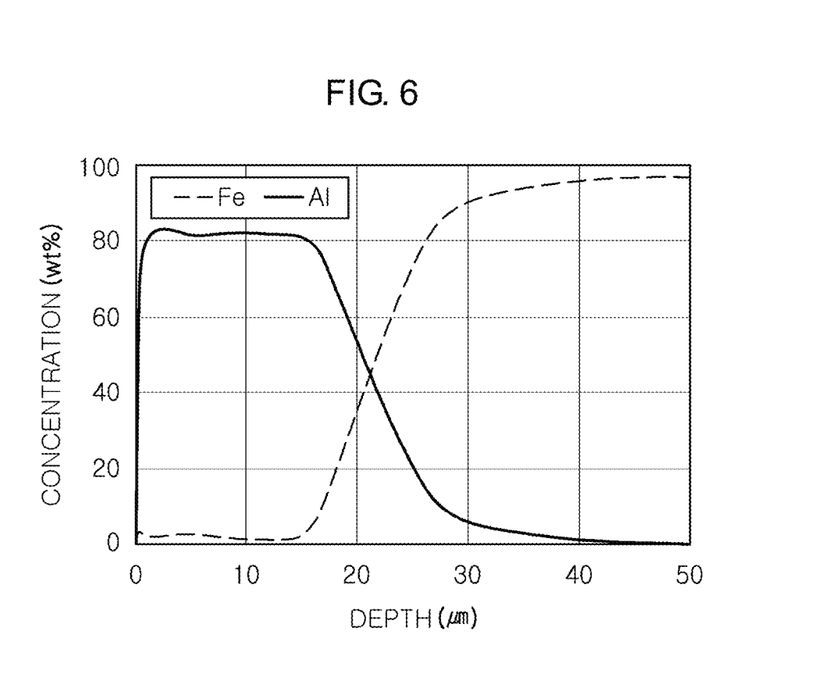
FIG. 6 is a compositional profile of a plating layer of a steel sheet manufactured by comparative example 1 analyzed by a GDS analyzer.
Figure 7:
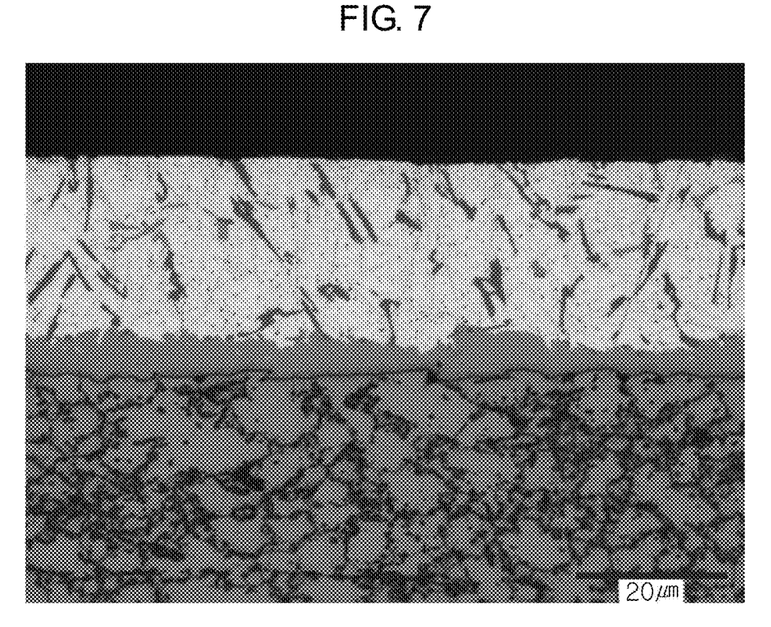
FIG. 7 is an optical microscopic image of a cross-sectional surface of a plating layer of a steel sheet manufactured by comparative example 1.

According to a result of analysis of the plating layer of the steel sheet using a GDS, a composition profile as in FIG. 6 was obtained, and an average content of Fe calculated based on the analysis was 25.6 weight %. As for a form of a cross-sectional surface of the steel sheet, the plating layer was formed on an exterior surface of a base steel sheet as illustrated in FIG. 7, and an aluminum-based oxide layer having a thickness of 0.03 μm was formed on a surface of the plating layer as illustrated in FIG. 3. Also, according to a result of analysis of a surface of the steel sheet using a spectrophotometer, a lightness value (L*) was 75.1.

Also, an amount of hydrogen absorbed to the steel sheet was analyzed using gas chromatography, and according to a result of the analysis, about 0.05 ppm of hydrogen was included in the steel sheet.

Comparative Example 2

The same aluminum plated steel sheet as in inventive example 2 to which the same plating process was performed and the heating and cooling processes were not performed was used as comparative example 2.

Figure 8:
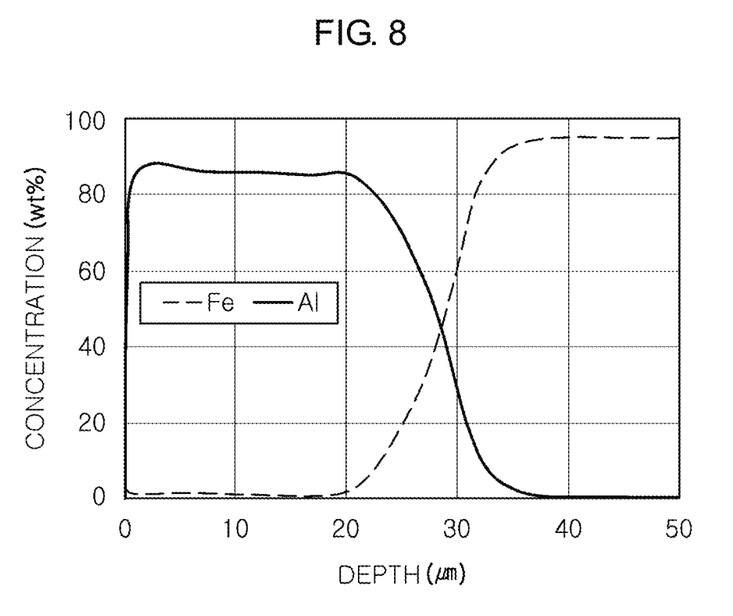
FIG. 8 is a compositional profile of a plating layer of a steel sheet manufactured by comparative example 2 analyzed by a GDS analyzer.
Figure 9:
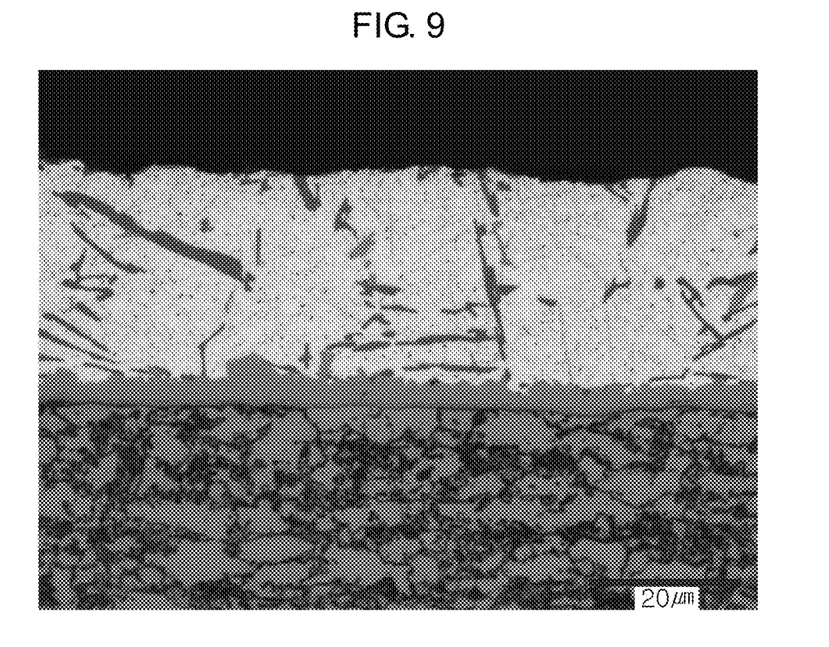
FIG. 9 is an optical microscopic image of a cross-sectional surface of a plating layer of a steel sheet manufactured by comparative example 2.

According to a result of analysis of the plating layer of the steel sheet using a GDS, a composition profile as in FIG. 8 was obtained, and an average content of Fe calculated based on the analysis was 15.8 weight %. As for a form of a cross-sectional surface of the steel sheet, the plating layer was formed on an exterior surface of a base steel sheet as illustrated in FIG. 9, and an aluminum-based oxide layer having a thickness of 0.015 μm was formed on a surface of the plating layer. Also, according to a result of analysis of a surface of the steel sheet using a spectrophotometer, a lightness value (L*) was 80.2.

Also, an amount of hydrogen absorbed to the steel sheet was analyzed using gas chromatography, and according to a result of the analysis, about 0.03 ppm of hydrogen was included in the steel sheet.

Comparative Example 3

A surface of the same steel sheet as in inventive example 1 was plated with aluminum with the same condition as that of inventive example 1, and the steel sheet was coiled, thereby obtaining an aluminum plated steel sheet. The aluminum plated steel sheet was heated to 500° C. in a batch annealing furnace under conditions as below.

An overall average temperature increase rate to 500° C.: 50° C./h

An average temperature increase rate in a temperature section 400 to 500° C.: 25° C./h Atmosphere at the time of heating: 100 vol % of hydrogen, and partial oxygen pressure of air pressure $10^{-36}$ A temperature difference between atmosphere and the steel sheet at the heating temperature: 35° C.

After the heating, the steel sheet was maintained at a constant temperature for 5 hours, and the steel sheet was air-cooled, thereby obtaining a steel sheet for a hot press forming process.

Figure 10:
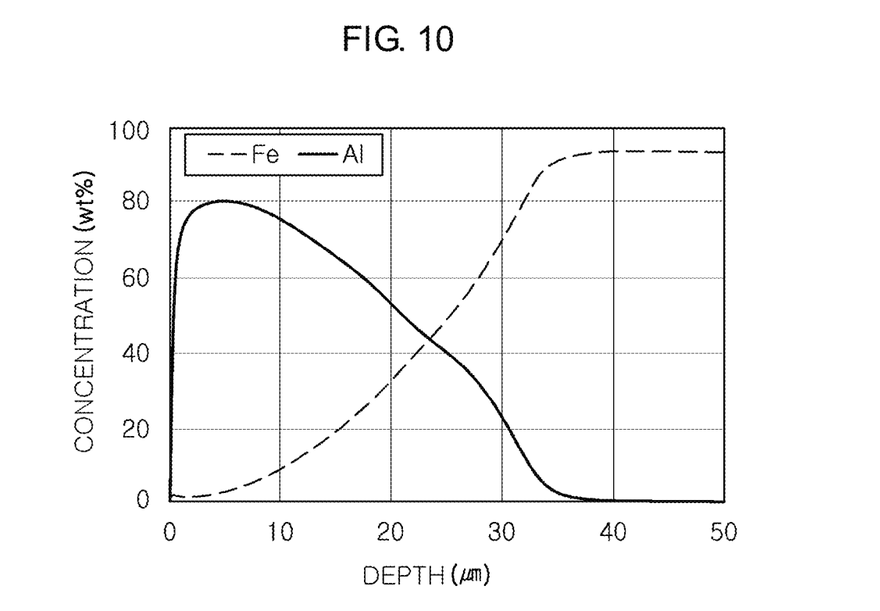
FIG. 10 is a compositional profile of a plating layer of a steel sheet manufactured by comparative example 3 analyzed by a GDS analyzer.
Figure 11:
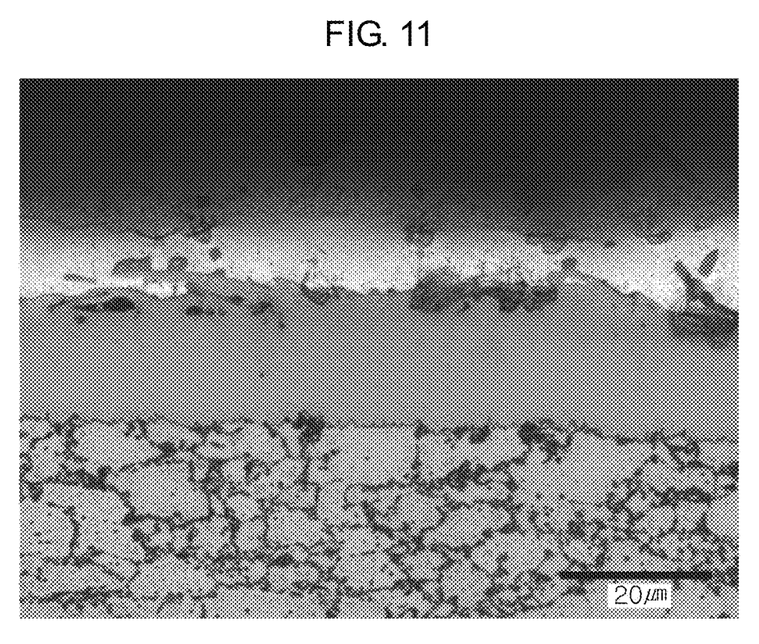
FIG. 11 is an optical microscopic image of a cross-sectional surface of a plating layer of a steel sheet manufactured by comparative example 3.

According to a result of analysis of the plating layer of the steel sheet using a GDS, a composition profile as in FIG. 10 was obtained, and an average content of Fe calculated based on the analysis was 31 weight %. As for a form of a cross-sectional surface of the steel sheet, the plating layer was formed on an exterior surface of a base steel sheet as illustrated in FIG. 11, and an aluminum-based oxide layer having a thickness of 0.015 μm was formed on a surface of the plating layer. Also, according to a result of analysis of a surface of the steel sheet using a spectrophotometer, a lightness value (L*) was 71.7.

Also, an amount of hydrogen absorbed to the steel sheet was analyzed using gas chromatography, and according to a result of the analysis, about 0.09 ppm of hydrogen was included in the steel sheet.

Hot Press Forming

The steel sheets of inventive examples 1 and 2 and comparative examples 1, 2, and 3 were heated to 950° C., were maintained at the above-mentioned temperature for five minutes. Thereafter, a hot press forming process in which the steel sheets were rapidly cooled while being pressured by a press was performed, thereby obtaining a hot press formed member.

A content of hydrogen included in the obtained member was measured using gas chromatography, and the content is listed in Table 2 below along with a content of hydrogen included the steel sheet.

TABLE 2

| Classification | Content of Hydrogen Included in Steel Sheet (ppm) | Content of Hydrogen Included in Member (ppm) |
| --- | --- | --- |
| Inventive Example 1 | 0.13 | 0.40 |
| Inventive Example 2 | 0.1 | 0.37 |
| Comparative Example 1 | 0.05 | 0.72 |
| Comparative Example 2 | 0.03 | 0.69 |
| Comparative Example 3 | 0.09 | 0.65 |

As indicated in Table 2 above, contents of hydrogen included in the steel sheets were 0.13 ppm and 0.1 ppm in inventive examples 1 and 2, respectively, which were higher than contents of hydrogen included in the steel sheets in comparative examples 1, 2, and 3, 0.05 ppm, 0.03 ppm, and 0.09 ppm, respectively. However, contents of hydrogen included in the hot press formed members were 0.4 ppm and 0.37 ppm in inventive examples 1 and 2, respectively, which were lower than contents of hydrogen in comparative examples 1, 2, and 3, 0.72 ppm, 0.69 ppm, and 0.65 ppm, respectively.

Hydrogen delayed fracture may occur in a member having strength higher than that of a steel sheet. In the inventive examples which satisfied the conditions of the present discourse, an amount of absorbed hydrogen during the heating process for the hot press forming process greatly decreased such that a content of hydrogen included in the member decreased, which may be effective to prevent hydrogen delayed fracture.

In the comparative examples, a content of hydrogen included in the steel sheet was not high before the hot press forming process, but an amount of absorbed hydrogen greatly increased during the heating for the hot press forming process such that a content of hydrogen included in the member was high, which may easily cause hydrogen delayed fracture.

Figure 12:
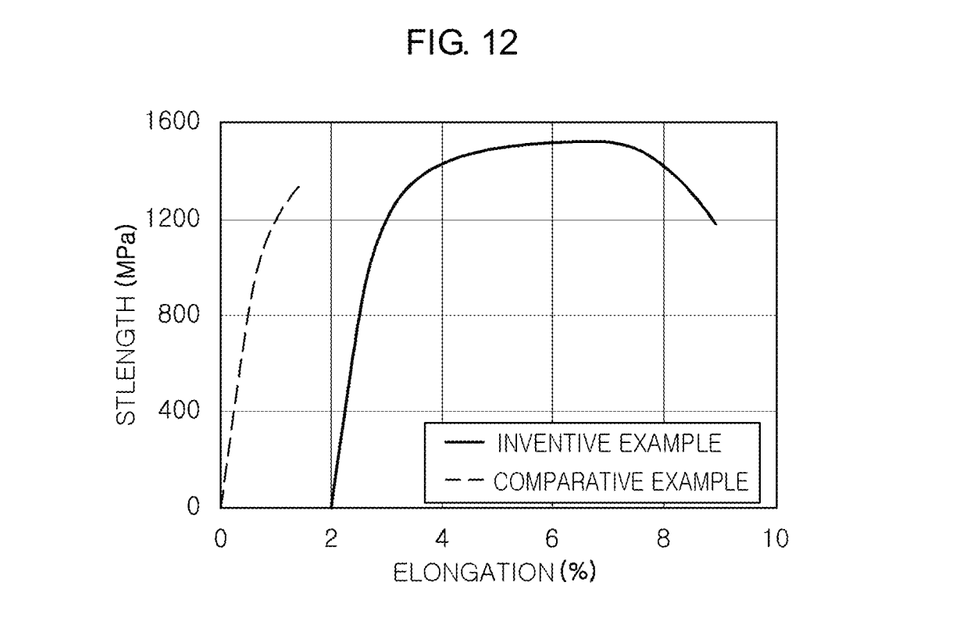
FIG. 12 is a graph illustrating a strength-elongation curve of a notch tensile test performed on a member obtained from inventive example 1 and comparative example 1.

To observe such a tendency, a notch tensile test was performed on the members obtained in inventive example 1 and comparative example 1. A notch tensile test is one method for assessing impact properties of a steel sheet. Hydrogen brittleness is abnormal brittleness or breakage caused by concentration of hydrogen in steel on defective portions such as notch or cracks while stress is applied. In this example, hydrogen brittleness was assessed through whether abnormal breakage occurred or not before a maximum tensile strength of the member was reached through a notch tensile test. FIG. 12 illustrates a strength-elongation rate curve of the notch tensile test performed on the members obtained from inventive example 1 and comparative example 1. Inventive example 1 appears to have a normal tensile curve, whereas in comparative example 1, due to hydrogen brittleness, abnormal breakage occurred before a maximum tensile strength was reached while stress increased.

Simulation test of hydrogen generation behavior during a hot press forming process To observe the phenomenon in which hydrogen is generated during the hot press forming process, a simulation test of hydrogen generation behavior was performed. The test was performed using a thermo gravimetric analyzer (TGA), and each steel sheet was heated according to a heating pattern (marked by a black line) illustrated in FIG. 13. During the heating, an increase of a weight of the steel sheet was measured, and an increase of a weight of the steel sheet indicates that oxidization similar to oxidation of chemical formula 1 occurred on a surface of the steel sheet and that accordingly, hydrogen was generated.

Figure 13:
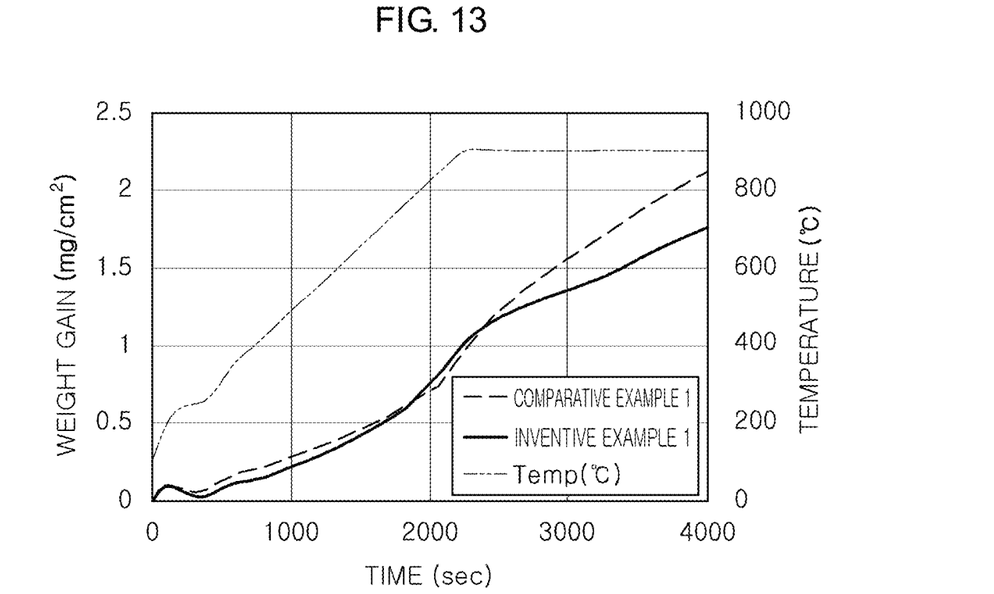
FIG. 13 is a graph illustrating heating patterns and changes in weight of when a TGA test is performed on inventive example 1 and comparative example 1.

It has been indicated that an increase of a weight at a high temperature in inventive example 1, marked by a solid line, was less than that of comparative example 1, marked by a dotted line.

The result indicates that an amount of generated hydrogen in inventive example 1 was less than an amount of generated hydrogen in comparative example 1, and that, accordingly, an amount of absorbed hydrogen in inventive example 1 was less than that of comparative example 1, which matched the result of measurement of an amount of hydrogen included in the steel sheet in an actual hot press forming process.

Thus, an advantageous effect of the present disclosure was observed.

The invention claimed is:

1. A steel sheet for a hot press formed member comprising:
    a base steel sheet and an aluminum alloy plating layer formed on the base steel sheet,
    wherein an Fe content profile and an Al content profile, appearing when the alloy plating layer is analyzed from a surface to an interface with the base steel sheet by glow discharge spectroscopy, form a first intersection point at which the profiles intersect in a position most adjacent to a surface of the aluminum alloy plating layer and a second intersection point at which the profiles intersect in a position second most adjacent to the surface of the aluminum alloy plating layer.

2. The steel sheet of claim 1, wherein an Fe content is lower than an Al content in the same position between the first intersection point and the second intersection point.

3. The steel sheet of claim 1, wherein an Fe content is at least 35 weight % between the first intersection point and the second intersection point.

4. The steel sheet of claim 1, wherein an Fe content between the surface of the aluminum alloy plating layer and the first intersection point is higher than an Fe content between the first intersection point and the second intersection point.

5. The steel sheet of claim 1, wherein an Fe content between the surface of the aluminum alloy plating layer and the first intersection point is 45 weight % or more.

6. The steel sheet of claim 1, wherein an Al content between the surface of the aluminum alloy plating layer and the first intersection point is lower than an Al content between the first intersection point and the second intersection point.

7. The steel sheet of claim 1, wherein the base steel sheet includes, by weight %, 0.04-0.5% of C, 0.01-2% of Si, 0.01-10% of Mn, 0.001-1.0% of Al, 0.05% or less of P, 0.02% or less of S, 0.02% or less of N, and a balance of Fe and inevitable impurities.

8. The steel sheet of claim 7, wherein a composition of the base steel sheet further includes, by weight %, at least one of 0.01-4.0% of a sum of at least one selected from a group consisting of Cr, Mo and W, 0.001-0.4% of a sum of at least one selected from a group consisting of Ti, Nb, Zr and V, 0.005-2.0% of Cu+Ni, 0.001-1.0% of Sb+Sn, and 0.0001-0.01% of B.

9. A method of manufacturing a steel sheet for a hot press formed member having hydrogen delayed fracture resistance, the method comprising:

obtaining an aluminum-plated steel sheet by aluminum-plating a surface of a base steel sheet and winding the base steel sheet;

obtaining an aluminum alloy plated steel sheet by annealing the aluminum plated steel sheet; and cooling the aluminum alloy plated steel sheet, wherein the amount of aluminum plating is 30-200 g/m$^2$ with respect to one side surface of the steel sheet, wherein winding tension is 0.5-5 kg/mm$^2$ during the wiring, wherein the annealing is performed for 30 minutes-50 hours in a heating temperature range of 550-750° C. in a batch annealing furnace, wherein, when the heating is performed from room temperature to the heating temperature during the annealing, an average temperature increase rate is 20-100° C./h, wherein oxygen partial pressure in the batch annealing furnace is in the range of $10^{-70}$-$10^{-20}$ atm during heat treatment, and wherein a difference between an atmospheric temperature in the batch annealing furnace and a temperature of the steel sheet is 5-80° C.

10. The method of claim 9, wherein the base steel sheet includes, by weight %, 0.04-0.5% of C, 0.01-2% of Si, 0.01-10% of Mn, 0.001-1.0% of Al, 0.05% or less of P, 0.02% or less of S, 0.02% or less of N, and a balance of Fe and inevitable impurities.

11. The method of claim 10, wherein a composition of the base steel sheet further includes, by weight %, at least one of 0.01-4.0% of a sum of at least one selected from a group consisting of Cr, Mo and W, 0.001-0.4% of a sum of at least one selected from a group consisting of Ti, Nb, Zr and V, 0.005-2.0% of Cu+Ni, 0.001-1.0% of Sb+Sn, and 0.0001-0.01% of B.

* * * * *